United States Patent [19]
Klein

[11] 4,019,093
[45] Apr. 19, 1977

[54] HORIZONTAL DYNAMIC DAMPER CIRCUITRY

[75] Inventor: Arthur H. Klein, Oakfield, N.Y.

[73] Assignee: GTE Sylvania Incorporated, Stamford, Conn.

[22] Filed: Oct. 9, 1975

[21] Appl. No.: 620,869

[52] U.S. Cl. .............................. 315/370; 315/408
[51] Int. Cl.² ........................................ H01J 29/56
[58] Field of Search .......... 315/370, 371, 407, 408, 315/409, 410

[56] References Cited
UNITED STATES PATENTS 3,349,279  10/1967  Schafft .............................. 315/370

Primary Examiner—Maynard R. Wilbur
Assistant Examiner—T. M. Blum
Attorney, Agent, or Firm—Norman J. O'Malley; Thomas H. Buffton; Robert T. Orner

[57] ABSTRACT

In a cathode ray tube display system having a horizontal deflection circuit which includes a horizontal deflection yoke and an "S" curve correction charge storage means, a dynamic damper circuit shunts the "S" correction charge storage means and includes a series connected charge storage means and a unidirectional conduction device shunted by an impedance whereby the dynamic damper circuit compensates for variations in potential at the "S" curve correction charge storage means due to intermittent load changes.

6 Claims, 4 Drawing Figures

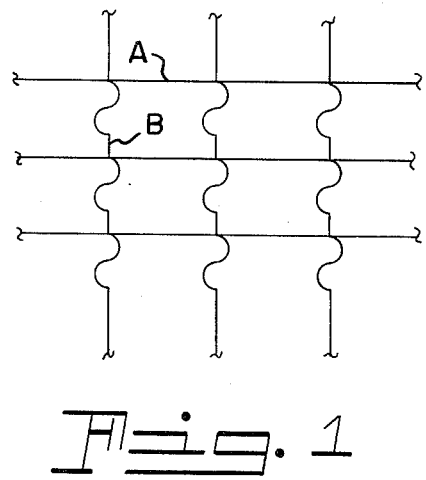
Fig. 1
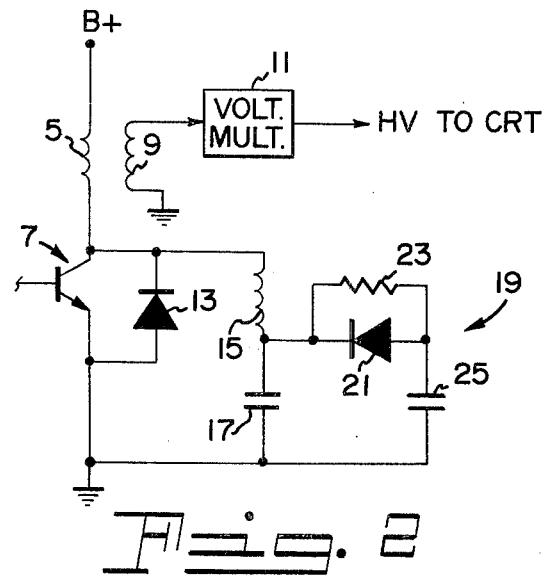
Fig. 2
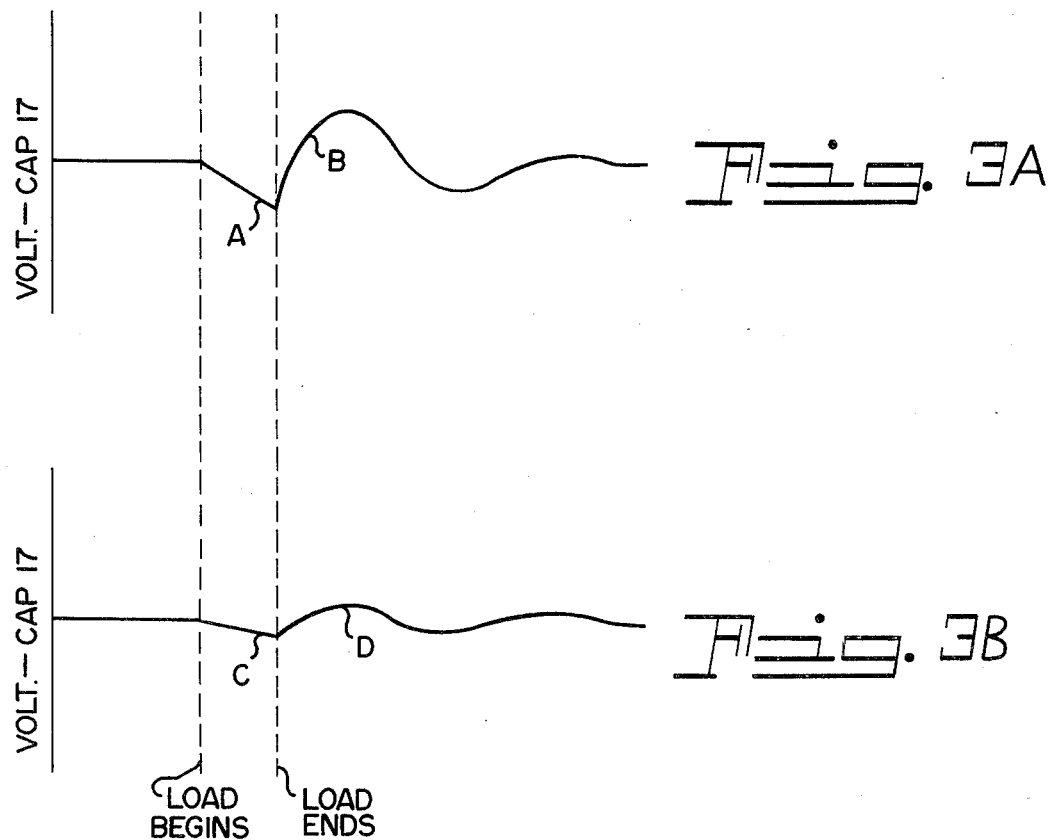
Fig. 3A
Fig. 3B

HORIZONTAL DYNAMIC DAMPER CIRCUITRY

BACKGROUND OF THE INVENTION

This invention relates to a dynamic damping circuit for a horizontal deflection system of cathode ray tube display apparatus wherein a ringing potential due to sudden large variations in the white video signal is damped without undue power dissipation. Prior art type apparatus typically included a horizontal deflection system having a series connected horizontal deflection yoke and an "S" curve correction capacitor. A resistor was shunted across the "S" curve correction capacitor or coupled from the junction of the deflection yoke and "S" curve correction capacitor to a potential source B+ in order to damp the ringing potential developed thereacross whenever the load on the system abruptly changed due to the intermittent appearance of large video signals representative of white information.

In another known form of apparatus, an "S" curve correction capacitor of greatly increased value is employed. However, the "S" curve correction capacitor of increased magnitude merely serves as a coupling capacitor and has the disadvantage of not providing the desired "S" shaping whereupon the horizontal deflection is non-linear rather than linear.

Although the above-mentioned apparatus did provide dampening of the undesired variations in potential appearing across the "S" curve correction capacitor, it was found that such apparatus undesirably distorted the sawtooth current flowing in the deflection yoke. As a result, linearity of the deflection was deleteriously affected. Moreover, the above-described damping system undesirably required constant power application thereto which undesirably added to the power losses in the system.

OBJECTS AND SUMMARY OF THE INVENTION

An object of the present invention is to provide an enhanced horizontal deflection system for cathode ray tube display apparatus. Another object of the invention is to improve the damping of ringing signals appearing in the horizontal deflection system due to intermittent large load variations and video signal changes representative of white information signals. Still another object of the invention is to provide dynamic damping of ringing potentials appearing in a horizontal deflection system. A further object of the invention is to provide damping circuitry which includes a charge storage capability for supplying a potential to effect damping of an undesired ringing potential appearing in a horizontal deflection circuit.

These and other and further objects, advantages and capabilities are achieved in one aspect of the invention by a dynamic damper circuit including a series connected charge storage means and shunt coupled impedance and unidirectional conduction device shunted across an "S" curve correction means in series with a horizontal deflection yoke winding with the "S" curve correction means and yoke windings shunted across a horizontal deflection signal source.

BRIEF DESCRIPTION OF THE DRAWINGS

FIG. 1 is a diagrammatic illustration of a portion of an ordinary crosshatch pattern appearing on a cathode ray tube when ringing potentials due to intermittent video signals representative of white information are not damped; and FIG. 2 is a schematic illustration of a horizontal deflection system which includes a preferred embodiment of the invention.

FIGS. 3A and 3B diagrammatically illustrate the effects provided by the invention.

PREFERRED EMBODIMENT OF THE INVENTION

For a better understanding of the present invention, together with other and further objects, advantages and capabilities thereof, reference is made to the following disclosure and claims in conjunction with the accompanying drawings.

Referring to FIG. 1 of the drawings, a portion of the display of the cathode ray tube activated by a well known crosshatch pattern is diagrammatically illustrated. As can be observed, the horizontal lines A are intermittent large changes in the video signal representative of white information and therefore present a large intermittent peak load on the scan and high voltage system of a cathode ray tube deflection system.

The problem is a decaying time ringing of the vertical lines B immediately after the horizontal lines or large peak loading of the scan system. Moreover, it has been determined that the above-mentioned decaying ringing is sinusoidal and very close to the resonant frequency of the horizontal scan system.

As previously mentioned, one technique for dampening the horizontal scan system to negate or reduce the above-mentioned ringing is to utilize a resistor which reduces the ringing problem but undesirably dissipates power continuously. Another possible and a preferred technique is to provide circuitry which provides dampening only when an undesired impulse potential is present.

Referring to FIG. 2, a horizontal deflection system includes a horizontal flyback transformer winding 5 coupled to a potential source B+ and by way of a horizontal output stage 7 to circuit ground. Another winding 9 of the horizontal flyback transformer is connected to circuit ground and to a voltage multiplier circuit 11 coupled to the high voltage terminal of a cathode ray tube (not shown).

A damper diode 13 shunts the horizontal output stage 7. Also, a horizontal deflection winding 15, associated with the cathode ray tube (not shown) is in series connection with an "S" curve correction capacitor 17. The series connected horizontal deflection winding 15 and "S" curve correction capacitor 17 are, in turn, shunted across the parallel connected horizontal output stage 7 and damper diode 13.

A dynamic damping circuit 19 is shunt connected across the "S" curve correction capacitor 17. The dynamic damping circuit 19 includes a diode 21 shunted by an impedance in the form of a resistor 23 with a capacitor 25 in series connection with the diode 21.

As to operation, a flyback pulse signal at the horizontal scan frequency from the horizontal output stage 7 causes development of a substantially sawtooth-shaped current flow through the horizontal deflection yoke 15. Moreover, the substantially sawtooth-shaped current is modified or altered at the beginning and end thereof by the "S" curve correction capacitor 17 in a manner well known in the art.

The "S" curve correction capacitor 17 has an average DC charge thereon in accordance with the potential source B+. Also, the capacitor 25 of the dynamic damping circuit 19 is charged by way of the resistor 23 to an average DC level substantially equal to the DC charge level of the "S" curve correction capacitor 17. Moreover, the DC charge on the "S" curve correction capacitor 17 varies in a parabolic-shaped manner at the horizontal scan frequency to effect alteration of the sawtooth current flow and provide the desired "S" correction at the beginning and ending of the sawtooth-shaped current waveform.

During a heavy load on the horizontal deflection system, such as white video information, for example, the average voltage across the "S" curve capacitor 17 will tend to drop. Assuming this load lasts for one or two horizontal lines and then charges in a step function, such as occurs with the white horizontal lines of a crosshatch pattern, the system will go through a damped sinusoidal recovery. At such a time, the video display exhibits an undesired instability such as illustrated in FIG. 1 of the drawings. Moreover, this instability or sinusoidal shifting of the display raster is at a frequency very close to the resonant frequency of the horizontal deflection yoke 15 and "S" curve correction capacitor 17.

However, the above-mentioned damped sinusoidal shifting of the display raster is substantially eliminated or at least greatly inhibited by the dynamic damping circuit 19. When the charge on the "S" curve correction capacitor 17 tends to drop, the capacitor 25 of the dynamic damping circuit 19 provides a compensating charge thereto via conduction of the diode 21. Thus, a sudden decrease in charge on the "S" curve correction capacitor 17 due to a change in loading is compensated by adding charge thereto provided by the capacitor 25 of the dynamic circuit 19.

Additionally, it may be noted that the capacitor 25 of the dynamic damping circuit 19 is preferably about twice the size of the "S" curve correction capacitor 17. Thus, an adequate charge storage capability is provided and this charge storage capability is only utilized when called upon by a sudden shift in loading of the horizontal deflection system.

As can be more readily seen in the illustration of FIG. 3, a deflection system 3A which does not include the dynamic damping circuit 19 of the present application will tend to exhibit a relatively large decrease in voltage "A" across the "S" shaping capacitor 17 upon application of a heavy load to the system. Moreover, the damped sinusoidal recovery "B" will tend to be of a relatively large magnitude. However, a deflection system 3B which includes the above-mentioned dynamic damping circuitry 19 desirably exhibits a relatively small decrease in voltage "C" across the "S" shaping capacitor 17 and a relatively small damped sinusoidal recovery potential "D".

As an example of a workable embodiment but in no way limiting the invention, the following component values may be employed:
capacitor 17 — 0.68 ufd
capacitor 25 — 1.50 ufd
resistor 23 — 6.8 k-ohms
diode 21 — General Electric Type A114C Thus, there has been provided a unique dynamic damper circuit for a horizontal deflection system of cathode ray tube apparatus. The dynamic damper circuit is not a cause for undesired continuous power dissipation but rather, serves to store energy which is provided when called upon. Moreover, the system is inexpensive of components and assembly which also enhances reliability.

While there has been shown and described what is at present considered the preferred embodiment of the invention, it will be obvious to those skilled in the art that various changes and modifications may be made therein without departing from the invention as defined by the appended claims.

What is claimed is:
1. In color cathode ray tube display apparatus having a horizontal deflection system, a dynamic damper circuit comprising:
   a potential source;
   a horizontal deflection signal source;
   a horizontal deflection yoke winding coupled to said potential source and horizontal deflection signal source;
   "S" curve correction means series connected to said horizontal deflection yoke winding, said series connected horizontal deflection yoke winding and "S" curve correction means shunting said horizontal deflection signal source; and
   dynamic damper means in the form of a series connected charge storage means and a diode shunted by an impedance shunt connected across said "S" curve correction means with said impedance providing a charge path and said diode providing a discharge path for said charge storage means form said potential source whereby undesired ringing signals in the horizontal deflection system due to large intermittent video signal changes are damped.

2. The dynamic damper circuit of claim 1 wherein said charge storage means of said dynamic damper means and said "S" curve correction means are in the form of capacitors with said charge storage means having a storage capability of about twice the storage capability of said "S" curve correction means.

3. The dynamic damper circuit of claim 1 wherein said impedance shunting said diode is in the form of a resistor.

4. In a color signal receiver, a dynamic damper circuit for a horizontal deflection system having a flyback transformer means coupled to a potential source and by a horizontal deflection signal source to circuit ground comprising:
   a series connected horizontal deflection yoke winding and an "S" curve correction means shunting said horizontal deflection signal source; and
   dynamic damper means including a series connected change storage means and a unidirectional conduction device shunted by an impedance, said damper means in shunt connection across said "S" curve correction means and coupled to said potential source with said impedance providing a charge path and said unidirectional conduction device providing a discharge path from said potential source to said charge storage means for dampening sudden changes in potential appearing at said "S" curve correction means due to intermittent large changes in loading of said horizontal deflection system.

5. The dynamic damper circuit of claim 4 wherein said charge storage means is in the form of a capacitor, said unidirectional conduction device is in the form of a diode, and said impedance is in the form of a resistor.

6. The dynamic damper circuit of claim 4 wherein said charge storage means and said "S" curve correction means are in the form of capacitors with said charge storage means of a value of about twice the value of said "S" curve correction means.

* * * * *